Dec. 19, 1961   E. H. G. MARON   3,013,851
COUNTER TOP PANEL AND CUTTING BOARD
Filed Aug. 12, 1958   2 Sheets-Sheet 1
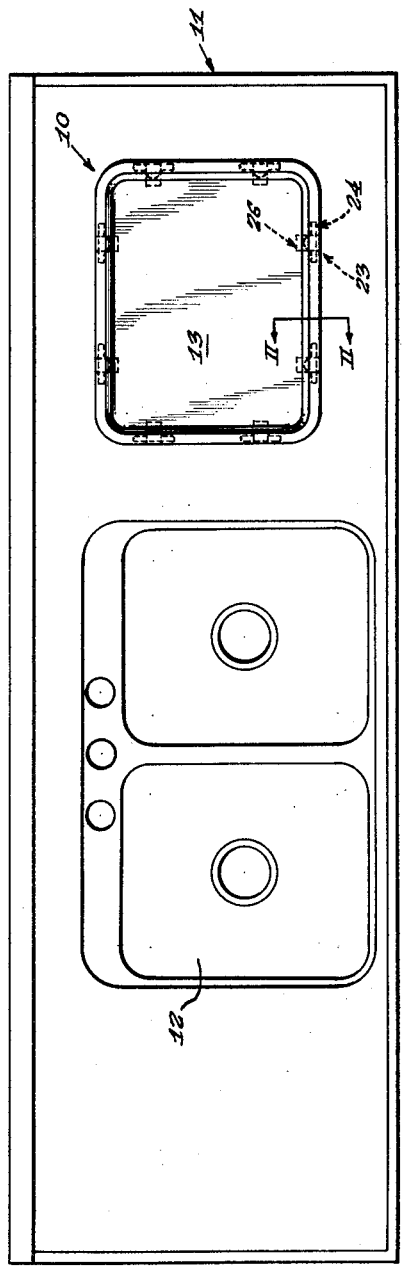
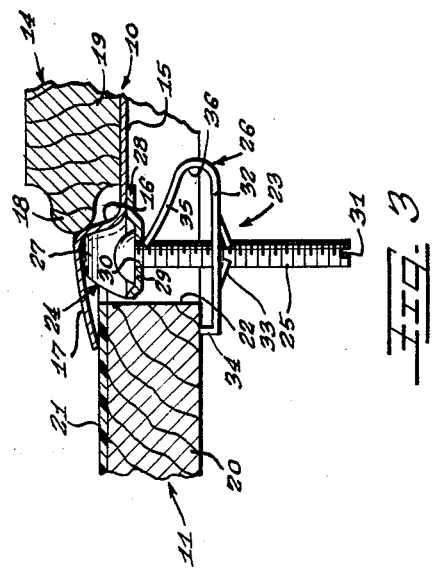
Inventor
Ernest H. G. Maron

United States Patent Office 3,013,851
Patented Dec. 19, 1961

3,013,851
COUNTER TOP PANEL AND CUTTING BOARD
Ernest H. G. Maron, Orchard Lake, Mich., assignor to Lyon Incorporated, Detroit, Mich., a corporation of Delaware
Filed Aug. 12, 1958, Ser. No. 754,647
4 Claims. (Cl. 312—140.4)

The present invention relates broadly to counter top constructions, and is more particularly concerned with a readily installable panel structure therefor functioning in a dual manner as a base for hot pans and the like and as a surface for various cutting operations.

Counter arrangements surfaced with thermosetting materials and having an integral cutting board located in a cutout in the counter top are well known to the art. However, this type construction is characterized by the disadvantages and objections of being relatively costly and unsanitary. Further, both the cutting board and the plastic counter top surface are subject to damage if hot pans or pots and the like are placed thereon, and the repair of such burned areas are quite expensive, particularly should the pattern of the original surfacing material have been discontinued.

It is accordingly an important aim of the present invention to provide a panel structure for counter tops characterized by a dual function to support hot pots and the like and to provide a surface for performance of cutting operations.

Another object of the present invention is to provide a counter top panel arrangement which may be installed by a person of limited carpentry skills with simple tools in a relatively short period of time.

Another object of this invention lies in the provision of a novel panel structure for counter tops which may be located at any position thereon and permits utilization of burned or worn out areas in the counter surfacing material.

A further object of the present invention is to provide an accessory for counter sinks and the like comprising a tray-like insert member rigidly secured within an opening in the counter top and a cutting board removably received within the insert member, possessed among other advantages of relatively low cost, simple installation and sanitary characteristics.

Other objects and advantages of the invention will become more apparent during the course of the following description, particularly when taken in connection with the accompanying drawings.

In the drawings, wherein like numerals are employed to designate like parts throughout the same:

FIGURE 1 is a top plan view of a typical installation of a counter top panel structure in accordance with the principles of this invention;

FIGURE 2 is a fragmentary sectional view taken substantially along the line II—II of FIGURE 1;

FIGURE 3 is a view similar to FIGURE 1, but with the cutting board installed in position;

Figure 4:
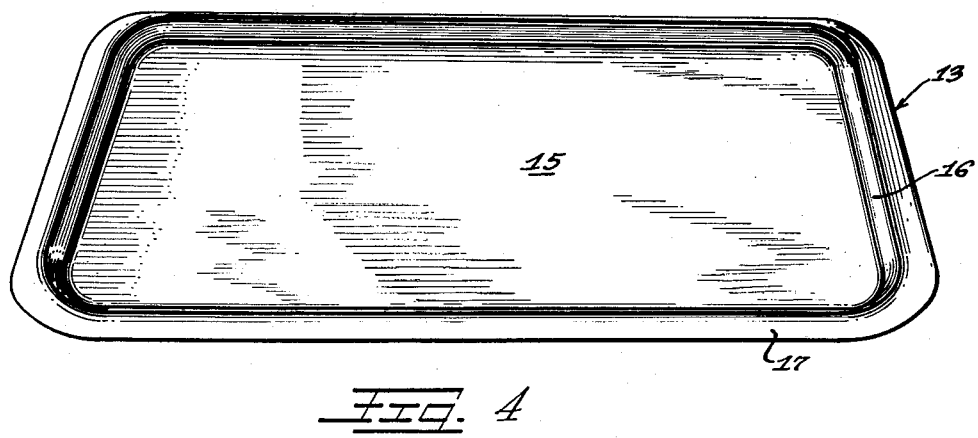
FIGURE 4 is a view in elevation of the tray-like insert or panel member of this invention.
Figure 5:
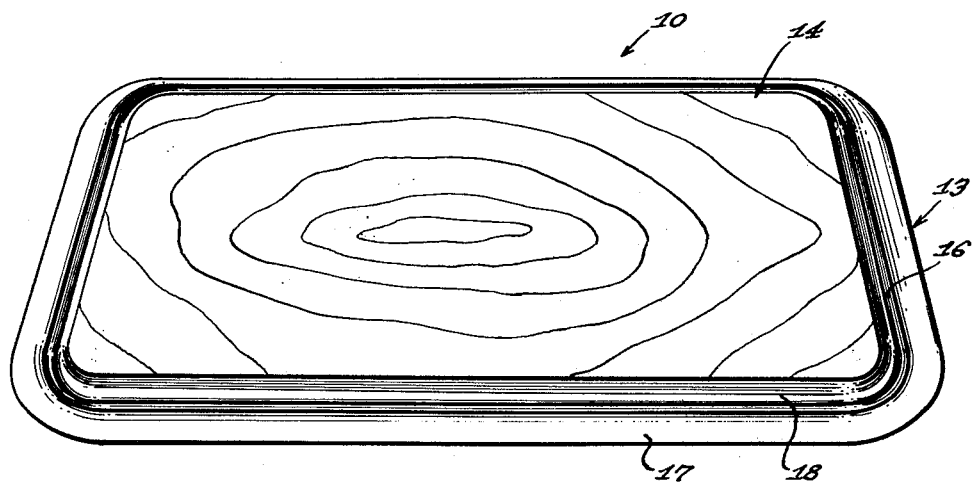
FIGURE 5 is a view similar to FIGURE 4, and showing the cutting board in installed position.

Referring now to the drawings, there is shown in FIGURE 1 a panel structure designated generally by the numeral 10 and supported by a counter top 11 which may further mount a sink 12 of either the single or double bowl type. It will be appreciated, however, that the installation of FIGURE 1 is illustrative only, and that the panel structure 10 of this invention need not be located in proximity to a sink 12 but may be positioned in any area upon the counter top 11.

With reference now also to the other views of the drawings, a panel structure 10 as constructed in accordance with the principles of this invention comprises two main components, namely, a tray-like insert or panel portion 13 and a cutting board 14 supported by said panel portion. The tray insert 13 in the exemplary embodiment shown is of generally rectangular shape, although of course said tray panel could be provided in square, circular, oval or other suitable shapes. The tray insert 13 is pressed by dies or in any other suitable manner to include a generally flat body portion 15 peripherally surrounded by and connecting with an obliquely disposed flange portion 16 integral with a smoothly curved outwardly and downwardly extending rim 17. A preferred material for the tray insert 13 is stainless steel, and by reason of the resilient flexibility of the material, the particular configuration of the peripheral portion of the panel insert, and the panel retaining means later to be described, the panel 13 possesses self-rimming characteristics and when mounted as in FIGURE 1 is in tensioned seating contact with the counter top 11.

The cutting board 14 is formed of a relatively hard, long life wood, and certain of the maples are suitable for this purpose. The cutting board possesses an outline conforming generally to that of the tray portion 13, and the periphery of the board may be formed with a tongue portion 18 extending horizontally outwardly. It may thereby be seen that the cutting board is possessed of a body portion 19 of lesser area than the body portion 15 of the tray insert 13, and that the outwardly extending tongue portion 18 of the cutting board bears firmly against the upstanding flange 16 of the tray insert to prevent accidental dislodgment of the cutting board from its support upon the tray insert during use.

The counter top 11 is constructed in the customary manner, and comprises a suitable wooden base 20 adhesively carrying upon the top surface a covering material 21, which may be linoleum or a thermosetting resin such as the known Formica or Micarta materials.

To mount the insert panel 13 upon the counter top 11, an opening 22 is cut therein sized to accommodate retaining means 23 in the manner of FIGURES 2 and 3. While other forms of retaining means may of course be employed, the device 23 possesses substantial advantages by way of ease of installation, relatively low manufacturing cost, and provision of an effective resilient securement of the panel to the counter top.

The preferred retaining means 23 comprises bracket structure 24 attached to the underside of the rim flange structure, the bracket means 24 receiving connecting screws 25 threadably associated with retaining clips 26. The bracket structure 24 is in the form of generally Z-bar shaped rail strips of suitable length, and said strips may extend substantially entirely along the front, rear and sides of the panel 13, or may be spaced therealong in the manner of FIGURE 1. Attachment of the bracket rails 24 may be effected by spot welding, brazing or the like. To render remote any possibility of warpage of the insert panel, by reason of the welds or drawing action of the clips 26, an upper flange 27 of each rail is secured to the underside of the panel 13 at generally the juncture of the upstanding flange 16 and rim portion 17 thereof, and with a lower rail flange 28 attached to the panel underside adjacent the juncture of the panel body portion 15 and upstanding flange portion 16 thereof. It may thus be seen that the bracket rails are secured to the most rigid portion of the rim flange structure, and since the rail possesses rigidity due to its angular cross-section, substantial additional reinforcement is afforded thereby to the panel flange structure.

Each bracket rail 24 is further provided with a debossed base portion 29 apertured at 30 and thereby forming a seating surface for the head portion of the connecting screw 25. The head portion of each screw is preferably rounded as shown to facilitate assembly of the retaining means 23 to the panel insert 13. Further, the opposite end of each screw 25 is provided with a slot 31 for reception of a screw driver.

Each of the clips 26 is shaped to include a generally horizontal gripping leg portion 32 of substantially greater width than the screw shank and provided intermediate its length with severed yieldable self-adjustable nut flange means 33 providing an aperture through the leg portion receiving the screw shank. The clip leg portion 32 is provided at one end with a rigid and upturned flange 34 engageable with the underside of the wooden base 20 of the counter top 11, and at its opposite end is provided with a generally oblique upwardly turned stabilizer leg 35 connecting with the main leg portion 32 by a shoulder bend 36. At its terminal end the clip stabilizer leg 35 thrustingly engages the screw shank, and normally when the assembly has been completed the end of the stabilizer leg 35 bears against the debossed base portion 29 of the bracket rails 24. To assure a more effective gripping of the parts, the nut flange means 33, upturned flange means 34 and outer end of the stabilizer leg 35 may be pronged or serrated.

The aperture 30 in the debossed base portion 29 of each bracket rail 24 is formed at one side with a chordally segmental enlargement (not shown) of slightly larger complementary shape with respect to the median cross-sectional shape and dimension of the screw head to permit insertion of the screw 25 from beneath the bracket rail debossed base portion. Accordingly, the screw head may be inserted upwardly in an angular direction and then slidably rocked over and and unto the seating surface provided by the debossed base portion. After the bracket rails have been secured to the peripheral portion of the insert panel 13 in the manner earlier described, each screw 25 may be positioned as noted and the clips 26 located thereon. By application of a screwdriver force, utilizing the slot 31 in the screw shank, each clip 26 is drawn into gripping contact with the counter top 11 and the peripheral flange portion 17 of the panel 13 caused to bear against the plastic laminate 21 in the manner shown in FIGURES 2 and 3. The tray panel 13 is thereby rigidly secured to the counter top 11, but by reason of the resiliency of the panel material, the configuration of the rim flange portion thereof and the retaining means 23 employed, warpage of the rim flange portion 17 is absent in spite of a substantial tensioned force applied thereto. Further, a self-rimming construction is provided which is additionally essentially water tight.

It may now be seen that applicant has provided a novel structure, comprising a tray-like insert and cutting board receivable therein, which serves a dual function of providing a supporting surface for hot pots and pans and as a cutting surface upon which various culinary severing operations may be performed. The provision of a panel 13 in a desired location upon a counter top effectively prevents burning or scorching of the plastic surfacing material for the counter top, and when the cutting board is located upon the panel, cutting or scratching of the counter top is eliminated. The cutting board is readily removable and accordingly may be washed with ease and maintained in a sanitary condition. The former expedient of providing a cutting board insert received in flush relation in the counter top accumulated food particles and accordingly presented an unclean and unsanitary appearance. Further, this earlier arrangement was quite expensive to fabricate. In addition, the cutting board insert integral with the counter top provided no solution to the problem presented by scorching or burning of the counter top. By the present invention, however, the burned or scorched area may be readily removed by cutting therethrough into the wooden base, and supporting in said opening in the manner of FIGURES 2 and 3 the novel structure herein disclosed. The installation is readily accomplished by persons of limited carpentry skills and may be effected in a short period of time with a minimum number of tools normally found in the average household. Thereby resurfacing of the entire counter top is avoided, and at the same time, a structure provided which has substantial utility from the dual standpoint noted.

It is to be understood that modifications and variations may be effected without departing from the scope of the novel concepts of the present invention.

I claim as my invention:

1. A structural arrangement for repair of damaged counter tops of the character comprising a base and covering material secured thereto, said arrangement including a self-rimming panel structure to be mounted in an opening in the counter top provided by removal of the damaged covering material and portion of the base therebeneath; said structure comprising a tray member having an outline conforming to the shape of the opening in the counter top and being provided with a generally flat recessed body portion received in said opening, a substantially obliquely disposed flange portion and a curved peripheral rim portion extending outwardly from the flange portion and seated upon the counter top covering material and bearing thereagainst; the distance from the top surface of the body portion to the top surface of the counter top being less than the height of the rim portion whereby the body portion is only slightly depressed below the counter top, a wooden base insert seated upon the tray body portion and having an outwardly extending tongue portion engaging the tray flange portion to maintain the wooden insert against accidental lateral dislodgement therefrom, said wooden base insert providing a surface upon which cutting operations may be performed and being freely received upon the tray member whereby said member provides a supporting surface for heated articles injurious to the counter top; and retaining means connecting with the tray member and counter top resiliently securing said member to the counter top, said retaining means comprising apertured bracket means secured to the underside of the tray rim portion, screw means received in the aperture in the bracket means and apertured clip means threaded on the screw means and engaging the counter top on the underside thereof to exert a resilient tensioned force on the tray rim portion upon tightening of the screw means.

2. A self-rimming panel structure to be mounted in covering relation to an opening in a counter top; said structure comprising a tray member having an outline conforming to the shape of the opening in the counter top and being provided with a generally flat recessed body portion received in said opening, a substantially obliquely disposed flange portion, and a curved peripheral rim portion extending outwardly from the flange portion and seated upon the counter top, the disance from the top surface of the body portion to the top surface of the counter top being less than the height of the rim portion whereby the body portion is only slightly depressed below the counter top; a wooden base insert seated upon the tray body portion and having an outwardly extending tongue portion engaging the tray flange portion to maintain the wooden insert against accidental lateral dislodgment therefrom, said wooden base insert providing a surface upon which cutting operations may be performed and being freely received upon the tray member whereby said member provides a supporting surface for heated articles injurious to the counter top; and retaining means connecting with the tray member and counter top resiliently securing said member to said counter top.

3. A self-rimming panel structure of the character defined in claim 2, in which the retaining means comprises apertured bracket means secured to the underside of the tray rim portion, screw means received in the aperture in the bracket means, and apertured clip means threaded on the screw means and engaging the counter top on the underside thereof to exert a resilient tensioned force on the tray rim portion upon tightening of the screw means.

4. A structural arrangement for repair of damaged counter tops of the character comprising a base and covering material secured thereto, said arrangement including a self-rimming panel structure to be mounted in an opening in the counter top provided by removal of the damaged covering material and portion of the base therebeneath; said structure comprising a tray member having an outline conforming to the shape of the opening in the counter top and being provided with a generally flat recessed body portion received in said opening, a substantially obliquely disposed flange portion and a curved peripheral rim portion extending outwardly from the flange portion and seated upon the counter top covering material and bearing thereagainst; the distance from the top surface of the body portion to the top surface of the counter top being less than the height of the rim portion whereby the body portion is only slightly depressed below the counter top, a wooden base insert seated upon the tray body portion and having an outwardly extending tongue portion engaging the tray flange portion to maintain the wooden insert against accidental lateral dislodgment therefrom, said wooden base insert providing a surface upon which cutting operations may be performed and being freely received upon the tray member whereby said member provides a supporting surface for heated articles injurious to the counter top; and retaining means connected with the tray member and counter top resiliently securing said member to the counter top.

References Cited in the file of this patent
UNITED STATES PATENTS

| | | |
|---|---|---|
| 1,031,117 | Hilker | July 2, 1912 |
| 1,743,763 | Erickson | Jan. 14, 1930 |
| 2,314,157 | O'Brien | Mar. 16, 1943 |
| 2,429,455 | Dellon | Oct. 21, 1947 |
| 2,445,915 | Karry | July 27, 1948 |
| 2,584,581 | Harris | Feb. 5, 1952 |
| 2,884,649 | Scharmer | May 5, 1959 |

FOREIGN PATENTS

| | | |
|---|---|---|
| 671,313 | Great Britain | Apr. 30, 1952 |

OTHER REFERENCES

Domestic Engineering Magazine, August 1957, pages 34 and 35.